United States Patent [19]
Leung et al.

[11] Patent Number: 5,784,603
[45] Date of Patent: Jul. 21, 1998

[54] FAST HANDLING OF BRANCH DELAY SLOTS ON MISPREDICTED BRANCHES

[75] Inventors: Arthur Leung. Sunnyvale; Joseph Petolino. Palo Alto. both of Calif.

[73] Assignee: Sun Microsystems, Inc.. Palo Alto. Calif.

[21] Appl. No.: 665,964

[22] Filed: Jun. 19, 1996

[51] Int. Cl.$^6$ .................................................. G06F 9/38
[52] U.S. Cl. ..................... 395/581; 395/586; 395/800.23
[58] Field of Search .................................. 395/580, 586, 395/706, 581, 800.23, 800.24

[56] References Cited

U.S. PATENT DOCUMENTS

| 5,509,130 | 4/1996 | Trauloen et al. | 395/391 |
| 5,655,097 | 8/1997 | Witt et al. | 395/380 |
| 5,706,459 | 1/1998 | Atsushi | 395/376 |

OTHER PUBLICATIONS

Su et al.. "Branch with Masked Squashing in Superpipelined Processors". *Proceedings of the 21st Annual International Symposium on Computer Architecture*, IEEE. Apr. 18–21. 1994, pp. 130–140.

*Primary Examiner*—William M. Treat
*Attorney, Agent, or Firm*—Townsend and Townsend and Crew LLP

[57] ABSTRACT

An apparatus and method for quickly and efficiently handling mispredicted branch instructions in a computer processor having multiple instruction execution pipelines and utilizing branch delay slot instructions. When a mispredicted branch occurs, all instructions that follow the branch in execution order, including the branch delay slot instruction, die in the pipeline. The delay slot, if it is to be executed, is then reissued to the pipeline.

22 Claims, 2 Drawing Sheets

FAST HANDLING OF BRANCH DELAY SLOTS ON MISPREDICTED BRANCHES

BACKGROUND OF THE INVENTION

The present invention relates to handling branch instructions in a computer having a multistage instruction pipeline. More specifically, the present invention relates to an apparatus and method for quickly and efficiently handling mispredicted branch instructions in a computer processor having multiple multistage instruction pipelines.

Reduced instruction set computers, commonly referred to as RISC processors, are one of the more common computer architectures in use today. In a nutshell, RISC processors rely on simple, low level instructions of the same size. Instruction execution is broken up into various segments and processed in a multistage pipeline. The pipeline is structured such that multiple instructions may be processed at any given instant. For example, a five-stage pipeline may include separate stages for fetching an instruction from memory (instruction fetch stage), decoding the instruction (decode stage), fetching operands the instruction needs (operand fetch stage), executing the instruction (execution stage) and writing the results back to the appropriate register or memory location (write back stage). Up to five instructions can be processed at once in such a pipeline—one in each stage.

Thus, such a RISC computer can theoretically achieve performance equivalent to executing one instruction each clock cycle. To achieve higher performance standards more than one instruction needs to be processed in each stage. This standard of performance can be achieved by superscalar processors. Superscalar processors are generally based on RISC architecture and incorporate multiple instruction pipelines. For example, one superscalar processor, the Ultrasparc manufactured by SUN Microsystems, includes six separate instruction pipelines: two for floating point calculations/graphics operations, two for integer calculations, one for branch operations and one for memory operations. Theoretically, a superscalar processor having six separate pipelines can process up to six instructions per clock cycle.

One limiting factor as to how many instructions can be processed per clock cycle in RISC, superscalar and other processors that employ instruction pipelines is branch instructions. When a processor executes code containing a branch instruction, the earliest the processor could possibly recognize that the branch is to be taken is at the instruction decode stage. At this point, however, the next instruction has already been fetched and possibly other actions have been taken. Thus, the fetched instruction and other actions must be discarded and a new instruction (the branch target) must be fetched. This problem is compounded because branches are common occurrences. Studies have shown that branch instructions generally occur about as often as once every five to ten instructions.

One way designers have addressed the branch problem is to implement elaborate schemes to predict whether a branch is likely to be taken and then fetch the branch target address as the next instruction rather than the next sequential instruction as appropriate. If the branch is correctly predicted, no delay in execution occurs. Only when the branch is incorrectly predicted is a throughput penalty suffered.

Given the possibility of mispredicting branches, other steps are taken to further speed processor execution. For example, designers may rely on the compiler to place instructions after the branch that are to be executed regardless of whether or not the branch is evaluated as predicted (referred to as a "non-annulling branch" below). Such instructions are referred to as branch delay slot instructions because they are positioned in the slot immediately following the branch instruction. If there is no appropriate instruction to place in the branch delay slot, a "no operation" instruction can be placed there instead.

Another technique gives the processor the ability to selectively annul an instruction appearing in the branch delay slot if it turns out that instruction should not be executed. This technique can be combined with the above one so that a compiler may use the delay slot for an instruction that should be executed only if the branch is mispredicted. Thus, the instruction would not be executed on a correct branch, but would "spring to life" on a mispredicted branch. Thus, the delay slot is used for a misprediction, similar to other delay slot instructions that are used regardless of whether the branch is correctly predicted. Alternatively, the "springing to life" could occur on a correct branch prediction. If the branch is not taken, the instruction can be annulled. A bit in the branch instruction may indicate if it is an "annulling branch" or a "non-annulling branch." This is done, for example, in the Sun Sparc™ processor.

Such a scheme is difficult to implement in a superscalar RISC processor, and is especially difficult to implement in one that allows for flexible instruction grouping rules such that one or more instructions from a mispredicted branch's target instruction stream may actually be executed at the same time (in the same pipeline stage) as their corresponding branch instruction. Generally, once an instruction is passed onto one of the multiple instruction pipelines, the processor does not easily know which pipelines contain instructions that must be cancelled in the event of a mispredicted branch. It is possible to implement a system of status bits/flags to keep track of which pipeline each instruction is sent to, but this requires extra hardware and involves other complexities.

Accordingly, from the above it can be seen that it is desirable to be able to quickly and efficiently process mispredicted branch instructions.

SUMMARY OF THE INVENTION

The present invention solves the above difficulties by providing a system that quickly and efficiently handles mispredicted branch instructions. According to the present invention, when a mispredicted branch occurs, all instructions that follow the branch in execution order die (are invalidated) in the pipeline. Simple logic is used to determine only whether an instruction in the pipeline is before or after the branch. More complicated logic to determine which instruction is the delay slot instruction is not used, nor is complicated logic used to selectively not invalidate the delay slot instruction. The delay slot, if it is to be executed, is then reissued to the pipeline.

In one embodiment of the present invention, a "misprediction queue" of instructions issued to the pipeline is maintained, with any delay slot instructions being identified (such as by being marked valid). If a branch is mispredicted, the delay slot instruction following the mispredicted branch instruction is killed in the pipeline along with the mispredicted branch target and subsequent instructions. After killing the delay slot instruction, the killed delay slot instruction is then reissued from the misprediction queue to the instruction pipeline while the correct branch target instruction is being retrieved.

In one embodiment of the apparatus of the present invention, a computer processor includes a plurality of instruction execution pipelines for executing instructions. A first of the plurality of execution pipelines executes branch instructions and the other execution pipelines each have an order bit that indicates whether or not an instruction being executed within a particular pipeline is subsequent to a branch instruction being executed by the first pipeline. The processor also includes an instruction dispatch unit that dispatches a plurality of instructions each clock cycle to said plurality of instruction pipelines, an instruction fetch unit that fetches the plurality of instructions for execution before the instructions are sent from the instruction dispatch unit, and a branch prediction unit that provides the instruction fetch unit with target instructions corresponding to branch instructions. When a branch instruction dispatched from the instruction dispatch unit to one of the execution pipelines is mispredicted, a corresponding delay slot instruction is killed in the pipeline it is being executed in and then reissued from the dispatch unit to an appropriate execution pipeline.

The features and advantages of the present invention will be more clearly understood from the ensuing detailed description taken in conjunction with the accompanying drawings.

DESCRIPTION OF SPECIFIC EMBODIMENTS

I. An Exemplary Processor Architecture

Figure 1:
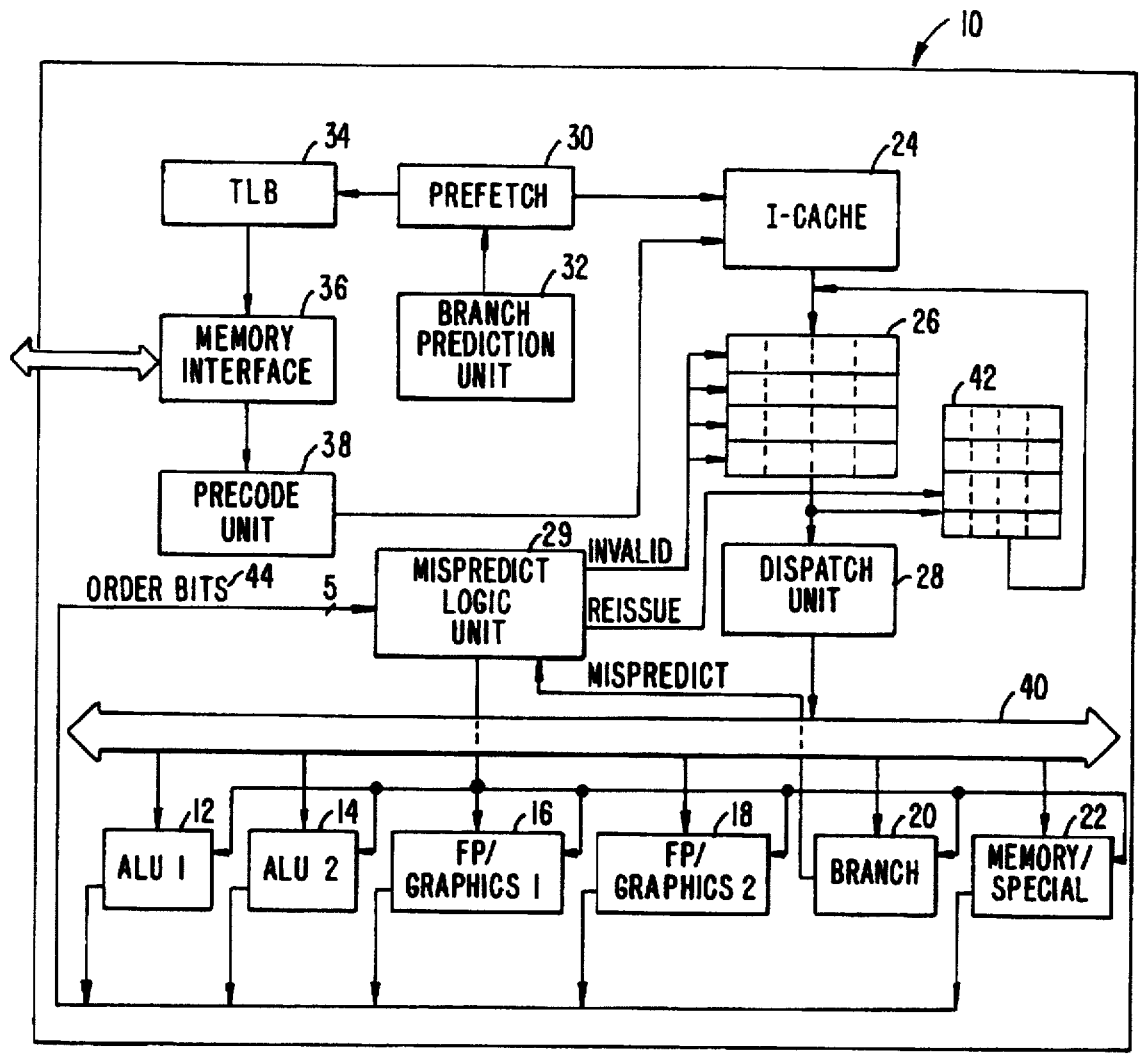
FIG. 1 is a simplified block diagram of a processor with which the present invention can be used.

FIG. 1 is a simplified block diagram of an exemplary superscalar processor architecture for which the present invention can be used. The processor illustrated in FIG. 1 is for exemplary purposes only and the scope of the present invention is not intended to be limited to this particular implementation of a superscalar processor.

In FIG. 1, processor 10 includes six different execution pipelines (integer ALU pipeline 12, integer ALU pipeline 14, floating point/graphics pipeline 16, floating point/ graphics pipeline 18, branch pipeline 20 and memory/ special pipeline 22). Instructions are provided to the execution pipelines from an instruction cache 24, through an instruction queue 26 and a dispatch unit 28. Instructions are fetched four at a time from cache 24. Queue 26 is organized as a four instruction wide and four instruction deep structure (a 16-entry first-in-first-out queue). A mispredict logic unit 29 determines if a branch instruction is mispredicted.

Instruction cache 24 receives its instructions from a prefetch unit 30. Prefetch unit 30 interfaces with a branch prediction unit 32, which predicts whether a branch is to be taken/untaken. Prefetch unit 30 generates and provides a virtual address to an instruction translation lookaside buffer (TLB) 34, which then causes instructions to be fetched from an external memory location through a memory interface 36. The instructions from the external memory are provided to a predecode instruction unit 38 to obtain certain information, such as whether it is a branch instruction, to instruction cache 24.

Up to six instructions at a time are fed from dispatch unit 28 and steered along a bus 40 to one of the six execution units 12–22 as appropriate. The dispatch unit dispatches as many as six such instructions each clock cycle, subject to checking for data dependencies and the availability of the proper functional unit. Dispatch unit 28 does not issue instructions out-of-order.

Figures 2, 3:
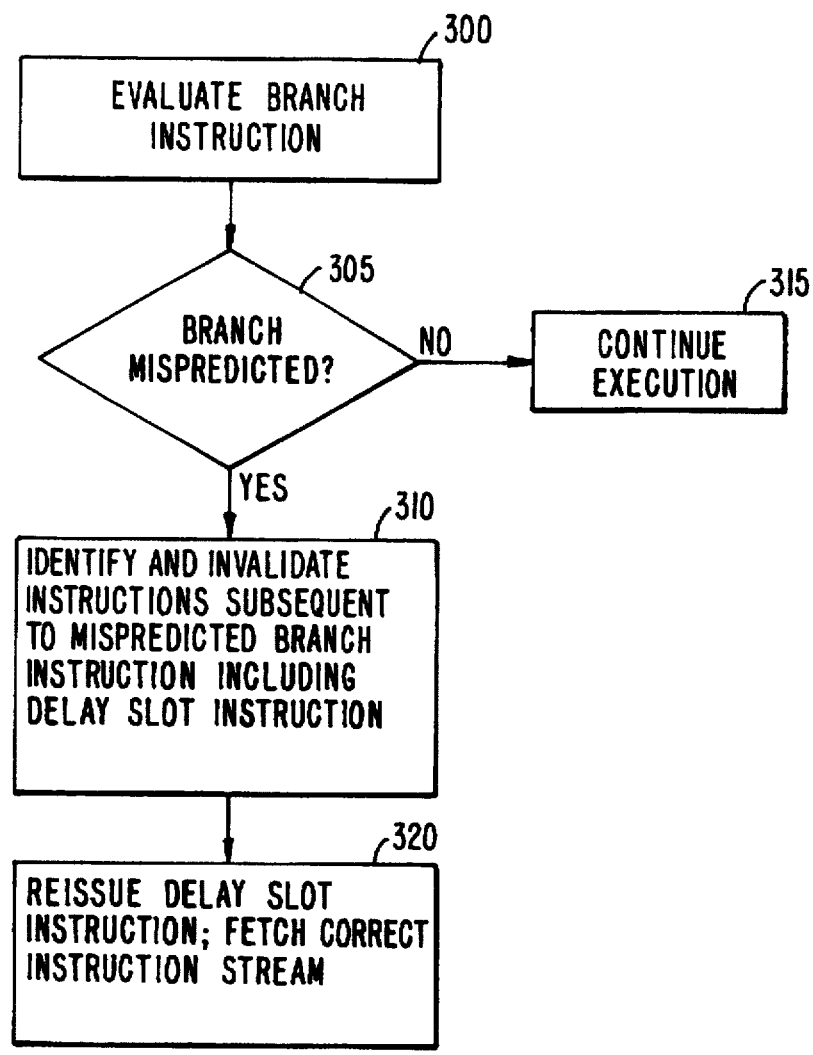
FIG. 2 is a diagram illustrating one embodiment of the stages of the instruction pipelines used by the processor shown in FIG. 1.
FIG. 3 is a flow chart illustrating the steps according to the method of the present invention when a branch instruction is mispredicted.

The pipeline implemented in the processor shown in FIG. 1 can be configured to include a variety of different stages. In one example, the pipeline is a 12-stage pipeline as shown in FIG. 2. In this exemplary pipeline, the execution of an instruction generally begins in the R stage (stage 5—initiates execution with access of the working register file) and continues in the E stage (stage 6). There are four stages prior to the R stage, including: the A stage (stage 1—address generation); the P and F stages (stages 2 and 3—two stage instruction cache access); and the I stage (stage 4—instructions are entered into instruction queue and steered toward an appropriate execution pipeline. The six stages after the E stage are used, for example, to access the data cache (the C stage—stage 7); detect data cache misses (the M stage—stage 8); write results into the working register file (the W stage—stage 9); continue execution of floating point operations and signal floating point and integer traps (the X and T stages—stages 10 and 11); and write floating point and integer results into the appropriate register files (the D stage—stage 12).

II. Fast Handling of Mispredicted Branches

The present invention can be used to quickly and efficiently handle mispredicted branches that occur in operation of a processor such as the exemplary processor of FIG. 1. According to the present invention, when a mispredicted branch occurs, all instructions that follow the branch in execution order die in the pipeline (are invalidated), and the delay slot, if it is to be executed, is reissued to the pipeline.

To illustrate the present invention, consider the following example program that includes the four instructions listed below in order:

| ADDRESS | INSTRUCTION |
| --- | --- |
| 10 | Add |
| 14 | Branch (to 1000) |
| 18 | <Delay Slot> |
| 1000 | Multiply |

When executed by the exemplary processor described above, the above instructions could be dispatched together from instruction queue 26 into appropriate execution pipelines. Thus, in this example, all four instructions may be executing simultaneously in the E stage of the pipelines: instruction 10 in ALU pipeline 12, instruction 14 in branch pipeline 20, delay slot 18 in memory pipe 22 and instruction 1000 in FPU pipeline 16.

If branch 14 was incorrectly predicted as taken, instruction 1000 (the branch target address) was incorrectly fetched as part of the target stream of instructions. In such a case, instruction 1000 should not be completed. Instead, the correct (e.g., the instruction of address 1C) and subsequent instruction stream should be fetched from the instruction cache and executed. Since instruction 1000 is already in the E stage, however, it cannot be distinguished from the other executing instructions and individually killed without implementing a complex system of status bits that identifies the location and status of each executing instruction.

The present invention solves this problem by providing a single status bit (order bit) associated with at least one stage of each executing pipeline that indicates whether or not the instruction being executed in that pipeline is before or after the branch instruction. This status bit is used by mispredict logic unit 29 to identify and kill all instructions issued after the branch instruction including the delay slot instruction. Thus, in the above example, these status bits indicate that instructions 18 and 1000 occurred after branch instruction 14 and are killed in the pipeline. The delay slot instruction is then reissued if it is to be executed.

In the case of a nonannulling delay slot, the delay slot is issued for the second time. Different scenarios exist in the case of an annulling delay slot depending on whether the delay slot "comes to life" on a misprediction or a correct prediction. If the delay slot was to be executed only on a misprediction, the delay slot is not originally sent to the pipeline in the present invention. Instead, it is held in either the instruction queue or the misprediction queue. After the misprediction is detected, the delay slot is sent to the pipeline for the first time. If the delay slot was to be executed on a correct branch prediction, the delay slot was originally sent to the pipeline. After the misprediction is detected, the delay slot is killed with the other instructions and not reissued to the pipeline. Reissuing the delay slot can be done within the normal latency period of the branch misprediction sequence.

III. Implementation of Handling Mispredicted Branches

The present invention implements the above described routine to handle mispredicted branches with a minimum of status and other bits and a unique mispredict queue. The status bits and the mispredict queue allow the present invention to (1) efficiently identify and invalidate instructions that are subsequent in execution order to the mispredicted branch instruction and (2) quickly fetch the correct instruction stream for execution.

FIG. 3 is a flow chart illustrating the steps according to the method of the present invention. As shown in FIG. 3, each branch instruction is evaluated by mispredict logic unit 29 (checked for mispredicted branches) in one stage of the pipeline (step 300), and, if a mispredicted branch is detected (step 305), subsequent instructions, including the branch target and delay slot instruction are invalidated in a subsequent stage (step 310). For example, in one preferred embodiment of the present invention that incorporates the stages shown in FIG. 2, branch instructions are evaluated in the E cycle of execution and subsequent instructions are invalidated in the C cycle. If a mispredicted branch is not detected, execution proceeds as normal (step 315).

After a branch misprediction occurs, the C stage of each pipeline is checked to determine if the instruction in that pipeline is subsequent in execution to the branch instruction. Instruction execution order is kept by status lines (binary signals connected to mispredict logic unit 29) that indicate, in the C stage, the order of execution for each instruction in each pipeline relative to every other pipeline. Thus, for example, in processor 10 there are five status lines that indicate the order of execution for an instruction in the C stage of branch pipeline 20 relative to instructions in the C stage of ALU pipeline 12, ALU pipeline 14, floating point/graphics pipeline 16, floating point/graphics pipeline 18, and memory/special pipeline 22, respectively. These five lines are sufficient to identify all instructions in the C stage that were issued subsequent to the branch instruction. A total of 15 such signals are required in processor 10 to identify the exact order of execution of every instruction in the C stage. These status lines are also referred to as "order bits" and are shown as order bits 44 in FIG. 1.

For convenience, the order bits that indicate the order of instructions in each pipeline relative to branch pipeline 20 can be referred to as:

A1_BEFORE_BR_C;

A2_BEFORE_BR_C;

F1_BEFORE_BR_C;

F2_BEFORE_BR_C; and

M_BEFORE_BR_C where A1 represents ALU pipeline 12, A2 represents ALU pipeline 14, F1 represents floating point/graphics pipeline 16, F2 represents floating point/graphics pipeline 18, BR represents branch pipeline 20 and M represents memory/special pipeline 22. Similar nomenclature can be used for the other order bits that indicate the relative order of instructions in other pipelines relative to each other.

The ordering logic is simplified by using these "paired" ordering bits that only identify if the instruction in one pipeline is before or after an instruction in another pipeline at the same stage. As can be seen, the duplicate comparison in other pipelines can be eliminated, so that only 15 lines are needed for 6 pipelines (rather than 6×5=30). For this invention, only 5 of those 15 lines need to be examined, since the complete order is not needed, only whether an instruction is before or after the branch. Thus, for N pipelines, only N−1 order bits are needed for the present invention.

Additionally, each stage of each execution pipeline in the processor has a single status bit (valid bit) associated with it that designates whether or not the instruction currently in that stage is a valid instruction. Thus, in a processor having six execution pipelines such as processor 10, each with twelve stages as shown in FIG. 2, there are a total of seventy-two valid bits that identify the validity of every instruction being processed in the pipelines. An ON valid bit in a given pipeline at a given stage indicates that the corresponding instruction is a valid instruction while an OFF bit indicates the corresponding instruction is invalid. Once a valid bit is turned OFF for a particular instruction, subsequent valid bits for that instruction are kept OFF as the instruction propagates through the subsequent stages of the pipeline. For convenience, the valid bits in the C stage of the pipelines can be represented by:

A1_VALID_C;

A2_VALID_C;

F1_VALID_C;

F2_VALID_C;

BR_VALID_C; and

M_VALID_C.

The remaining valid bits of the other pipeline stages can be represented by similar nomenclature.

The combination of order bits and valid bits allows processor 10 (through mispredict logic unit 29) to identify and invalidate all instructions that succeed a mispredicted branch. For example, the validity of the instruction executing in the C stage of floating point/graphics pipeline 16 (F1) is determined according to the following algorithm:

$$F1\_VALID\_M\_A1 = F1\_VALID\_C \cap \sim(IF\ MISPREDICT \cap BR\_BEFORE\_F1\_C)$$

where F1_VALID_M_A1 represents the value of valid bit of the C stage of the F1 pipeline in the next (or M) cycle, ~ represents the boolean NOT operation and ∩ represents the boolean AND operation. Thus, according to the formula, the valid bit of the F1 pipeline is switched OFF if either it was switched OFF in any of the previous pipeline stages or if there was a mispredicted branch and the instruction executing in the F1 pipeline occurs after the branch instruction. The validity of instructions in the C stage of each of the remaining pipelines is determined by a similar algorithm. Additionally, because dispatch unit 28 does not issue out-of-order instructions, the valid bits of all instructions in stages prior to the C stage are also switched OFF. In one embodiment, instructions in instruction queue 26 may also be invalidated by mispredict logic unit 29. This process ensures that all instructions from the mispredicted instruction stream are purged from the pipelines and also results in the cancellation of the delay slot instruction as described above.

After the appropriate instructions have been invalidated, processor 10 fetches the correct instruction stream following the mispredicted branch instruction and reissues the cancelled delay slot instruction (step 320). The delay slot instruction is retrieved from a mispredict queue 42 shown in FIG. 1. As instructions are passed in sets of four from instruction queue 26 to dispatch unit 28, they are also sent to mispredict queue 42.

Mispredict queue 42 is four instructions wide and seven deep. It is a first-in-first-out (FIFO) queue that keeps instructions sent to it up until the C stage of execution. After the C stage, processor 10 knows whether or not a branch was correctly predicted. If mispredicted, the corresponding delay slot instruction stored in the mispredict queue is sent back to the instruction queue so the delay slot can be reissued. If correctly predicted, the instructions in the mispredict queue are removed from the queue according to the standard FIFO algorithm. The mispredict queue has a status bit for each entry that indicates whether each stored instruction is valid or not. These status bits are set to OFF for instructions stored in mispredict queue 42 that are not delay slot instructions.

Two special circumstances are addressed in the implementation of the present invention. The first occurs when a branch instruction being executed reaches the C stage of execution before its corresponding delay slot is fetched from memory. This may occur, for example, in the case of a cache miss on retrieving the branch delay slot instruction. To handle this situation, the status bit of the entry in the mispredict queue corresponding to the delay slot instruction being fetched is set to not valid (OFF). In the event of a mispredicted branch, instructions from mispredict queue 42 are not loaded into instruction queue 26, and are instead retrieved from memory.

A second special circumstance occurs when the delay slot instruction is another branch instruction. Some potential difficulties that could be encountered in this situation are avoided in that dispatch unit 26 only dispatches one branch instruction per stage since there is only one branch pipeline. Then, when a branch instruction is placed in another branch instruction's delay slot, both instructions are predicted as not taken and the appropriate subsequent instruction stream is fetched. If the first branch instruction is mispredicted, the second delay slot branch is thus not requeued from mispredict queue 42. Instead, the second branch instruction is refetched. This scheme simplifies logic that would otherwise be required to ensure the integrity of the program counter.

Having fully described several embodiments of the present invention, many other equivalents or alternatives will be apparent to those skilled in the art. These equivalents and alternatives are intended to be included within the scope of the present invention.

What is claimed is:

1. A method for handling mispredicted branch instructions in a computer processor having a plurality of execution pipelines and a branch prediction unit, said method comprising the steps of:

issuing a branch instruction;

issuing a non-annulling delay slot instruction following said branch instruction;

if said branch instruction is mispredicted, determining which instructions in said pipelines follow said branch instruction;

invalidating all instructions in said pipelines following said mispredicted branch instruction including said delay slot instruction; and thereafter, reissuing said non-annulling delay slot instruction to said instruction pipelines.

2. The method of claim 1 wherein said issued delay slot instruction is stored in a mispredict queue and wherein said delay slot instruction is reissued from said mispredict queue.

3. The method of claim 2 further including the step of tagging said delay slot instruction in said mispredict queue with a status bit.

4. The method of claim 1 further comprising the step of:

if a branch is mispredicted as taken, killing a first instruction following the delay slot instruction in order of execution that is associated with the mispredicted branch target.

5. The method of claim 4 wherein each of said plurality of execution pipelines includes an order bit that indicates whether or not an instruction being executed in that pipeline is before or after said mispredicted branch instruction and wherein said steps of killing the delay slot and the first instruction check said order bits to identify which instructions to kill.

6. The method of claim 5 wherein a valid bit is associated with each stage of each of said plurality of pipelines and wherein instructions are killed by switching a corresponding valid bit OFF.

7. The method of claim 1 wherein said computer processor further supports annulling delay slot instructions.

8. The method of claim 7 further comprising the step of, if the branch prediction unit predicted that an annulling delay slot instruction is not to be executed, issuing said annulling delay slot instruction to an execution pipeline for the first time after said branch is mispredicted.

9. The method of claim 7 wherein if the branch prediction unit predicted that an annulling delay slot instruction is to be executed, said annulling delay slot instruction is annulled and not issued to an execution pipeline after said branch is mispredicted.

10. The method of claim 1 wherein said computer processor includes n execution pipelines and wherein said step of determining which instructions in said pipeline follow said mispredicted branch instruction includes the step of referencing n-I order bits.

11. A method for executing instructions in a computer processor having a plurality of execution pipelines, that utilizes a branch prediction scheme and that executes delay slot instructions after branch instructions, said method comprising the steps of:

issuing a branch instruction to one of said plurality of execution pipelines;

predicting whether or not said branch instruction is to be taken;

issuing a non-annulling delay slot instruction to one of said plurality of execution pipelines;

issuing a subsequent instruction based upon whether or not said branch instruction is predicted as taken to one of said plurality of execution pipeline, said subsequent instruction having a first address if said branch instruction is predicted as taken and said subsequent instruction having a second address if said branch instruction is predicted as not taken;

executing said branch instruction to determine whether or not said branch instruction was correctly predicted;

if said branch instruction is mispredicted, killing said non-annulling delay slot instruction and said subsequent instruction; and thereafter, reissuing said killed delay slot instruction to the instruction pipeline and issuing said subsequent instruction having said first address if said branch instruction was predicted as not taken and said subsequent instruction having said second address if said branch instruction was predicted as taken.

12. In a computer system having a plurality of instruction execution pipelines and that utilizes a branch prediction scheme and delay slot instructions, an apparatus for handling mispredicted branch instructions, said apparatus comprising:

an instruction execution unit configured to execute instructions including branch instructions and non-annulling delay slot instructions following said branch instructions, said instruction execution unit further configured to detect whether or not a branch instruction is correctly predicted as taken and, if said branch instruction is mispredicted, (i) invalidate all instructions in said pipelines following said mispredicted branch instruction including a non-annulling delay slot instruction, and (ii) reissuing said non-annulling delay slot instruction to said instruction pipelines.

13. The computer system of claim 12 wherein said instruction execution unit comprises a plurality of instruction pipelines with each of said plurality of instruction pipelines having a plurality of stages associated with it; wherein each of said plurality of stages has a status bit indicating whether an instruction executing in a respective stage is valid; and wherein said instruction execution unit kills said non-annulling delay slot instruction by setting a status bit associated with said non-annulling delay slot instruction to invalid.

14. The computer system of claim 13 wherein said instruction execution unit further comprises order lines associated with each instruction pipeline, each of said order lines indicating whether an instruction executing in an associated pipeline is before or after a branch instruction executing in one of said instruction pipelines.

15. The computer system of claim 13 wherein said instruction execution unit comprises an instruction dispatch system configured to reissue said non-annulling delay slot instruction.

16. The computer system of claim 15 wherein said instruction dispatch system comprises:

an instruction dispatch unit configured to dispatch instructions, including said non-annulling delay slot instruction, to said instruction execution unit;

an instruction fetch unit configured to fetch instructions from memory; and an instruction queue configured to store a plurality of instructions fetched from memory before they are dispatched from said instruction dispatch unit to said instruction execution unit.

17. The computer system of claim 16 wherein said instruction dispatch system further comprises a mispredict queue configured to store instructions sent from said instruction queue to said dispatch unit.

18. The computer system of claim 17 wherein said mispredict queue is configured to store instruction from said instruction queue until at least an execution stage of said instruction pipelines.

19. A computer processor comprising:

a plurality of instruction execution pipelines, each divided into a plurality of stages, for executing instructions, said plurality of execution pipelines including a first pipeline for executing branch instructions and a plurality of remaining execution pipelines, said plurality of remaining execution pipelines each having an order bit indicating whether or not an instruction being executed within a pipeline is subsequent to a branch instruction being executed by said first pipeline;

an instruction dispatch unit configured to dispatch a plurality of instructions each clock cycle to said plurality of instruction pipeline;

an instruction fetch unit configured to fetch said plurality of instructions for execution before said instructions are sent from said instruction dispatch unit;

a branch prediction unit configured to provide said instruction fetch unit with target instructions corresponding to branch instructions;

wherein said instruction dispatch unit dispatches a first non-annulling delay slot instruction corresponding to a first branch instruction; and wherein if said first branch instruction is mispredicted by said branch prediction unit, said first non-annulling delay slot instruction is killed in one of said plurality of execution pipelines and then reissued to one of said plurality of execution pipelines from said instruction dispatch unit.

20. The computer processor of claim 19 further comprising a mispredict queue for storing and resending said non-annulling delay slot instruction to said non-annulling dispatch unit when said delay slot instruction is killed after said branch instruction is mispredicted.

21. The computer processor of claim 20 wherein each stage of each of said plurality of execution pipelines has a corresponding valid bit and wherein said non-annulling delay slot instruction is killed by switching said valid bit OFF.

22. The computer processor claim 21 wherein all instructions subsequent to said mispredicted branch instruction are killed by having their corresponding valid bit switched OFF.

* * * * *